(12) United States Patent
Tanaka et al.

(10) Patent No.: US 8,941,906 B2
(45) Date of Patent: Jan. 27, 2015

(54) OPTICAL SCANNING DEVICE

(71) Applicants: Toyoki Tanaka, Tokyo (JP); Tsukasa Yamada, Tokyo (JP); Takahiko Nishiyama, Tokyo (JP)

(72) Inventors: Toyoki Tanaka, Tokyo (JP); Tsukasa Yamada, Tokyo (JP); Takahiko Nishiyama, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 299 days.

(21) Appl. No.: 13/632,342

(22) Filed: Oct. 1, 2012

(65) Prior Publication Data
US 2013/0083379 A1    Apr. 4, 2013

(30) Foreign Application Priority Data
Oct. 3, 2011 (JP) ................... 2011-219661

(51) Int. Cl.
*G02B 26/08* (2006.01)
(52) U.S. Cl.
CPC ................... *G02B 26/0858* (2013.01)
USPC ........................................ 359/224.1
(58) Field of Classification Search
CPC ............... G02B 26/105; G02B 26/101; G02B 26/0858; G02B 26/0841; G02B 26/0844; G02B 26/085; G02B 26/10

USPC .......... 359/198.1, 223.1–226.1, 199.1, 212.1, 359/200.8
See application file for complete search history.

(56) References Cited

U.S. PATENT DOCUMENTS

2011/0205608 A1* 8/2011 Mizoguchi ................. 359/198.1

FOREIGN PATENT DOCUMENTS

JP    2010-128116    6/2010

* cited by examiner

*Primary Examiner* — Euncha Cherry
(74) *Attorney, Agent, or Firm* — IPUSA, PLLC

(57) ABSTRACT

An optical scanning device includes a mirror part including a mirror reflecting surface to reflect incident light, a pair of torsion bars configured to support the mirror part from both sides and configured to form a first axis around which to swing the mirror part by a torsional motion thereof so as to deflect the reflected light, and at least one stress alleviation area configured to alleviate a stress generated by the torsional motion of the torsion bars. The alleviation area is provided between an intersection of a second axis perpendicular to the first axis and passing through the center of the mirror reflecting surface and an edge of the mirror reflecting surface, and at least one of the torsion bars.

16 Claims, 7 Drawing Sheets

○ : POSITIVE SIDE DRIVE BEAM
△ : NEGATIVE SIDE DRIVE BEAM 95 94 93 92   80 10   96 97 98 99
     110                    110

OPTICAL SCANNING DEVICE

CROSS-REFERENCE TO RELATED APPLICATIONS

This patent application is based upon and claims the benefit of priority of Japanese Patent Application No. 2011-219661, filed on Oct. 3, 2011, the entire contents of which are incorporated herein by reference.

BACKGROUND OF THE INVENTION

1. Field of the Invention

The present invention relates to an optical scanning device, and more particularly to an optical scanning device that supports a mirror part including a mirror reflecting surface from both sides by a torsion bar, where the mirror part swings around the torsion bar to be an axis, and deflects light reflected from the mirror reflecting surface.

2. Description of the Related Art

Conventionally, an optical scanning device is known that includes a movable plate including a reflecting surface to reflect incident light, a torsion beam to support the movable plate as a shaft, and a drive part to apply a drive force in a torsion direction on the torsion beam. In such a conventional optical scanning device, a configuration is known where ribs are formed on the back surface including a neighborhood of a connection part between the movable plate and the torsion beam in order to reduce deformation of the reflecting surface while rotating, as disclosed in Japanese Patent Application Laid-Open Publication No. 2010-128116 (which is hereinafter called "Patent Document 1").

However, in a configuration disclosed in Patent Document 1, even though the deformation of the reflecting surface can be compensated for, there is a concern that stress can be concentrated in the vicinity of the rib structure so that destruction is likely to occur. Moreover, even where the destruction may not occur, because the stress is applied to the neighborhood of the rib structure, material fatigue can occur, which causes performance degradation.

SUMMARY OF THE INVENTION

Embodiments of the present invention provide a novel and useful optical scanning device solving one or more of the problems discussed above.

More specifically, embodiments of the present invention provide a optical scanning device that can alleviate a stress applied to a mirror part, and can reduce destruction and material fatigue.

According to one embodiment of the present invention, there is provided an optical scanning device. The optical scanning device includes a mirror part including a mirror reflecting surface to reflect incident light, a pair of torsion bars configured to support the mirror part from both sides and configured to form a first axis around which to swing the mirror part by a torsional motion thereof so as to deflect the reflected light, and at least one stress alleviation area configured to alleviate a stress generated by the torsional motion of the torsion bars, the alleviation area being provided between an intersection of a second axis perpendicular to the first axis and passing through the center of the mirror reflecting surface and an edge of the mirror reflecting surface, and at least one of the torsion bars.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to drawings of embodiments of the present invention.

First Embodiment

Figure 1:
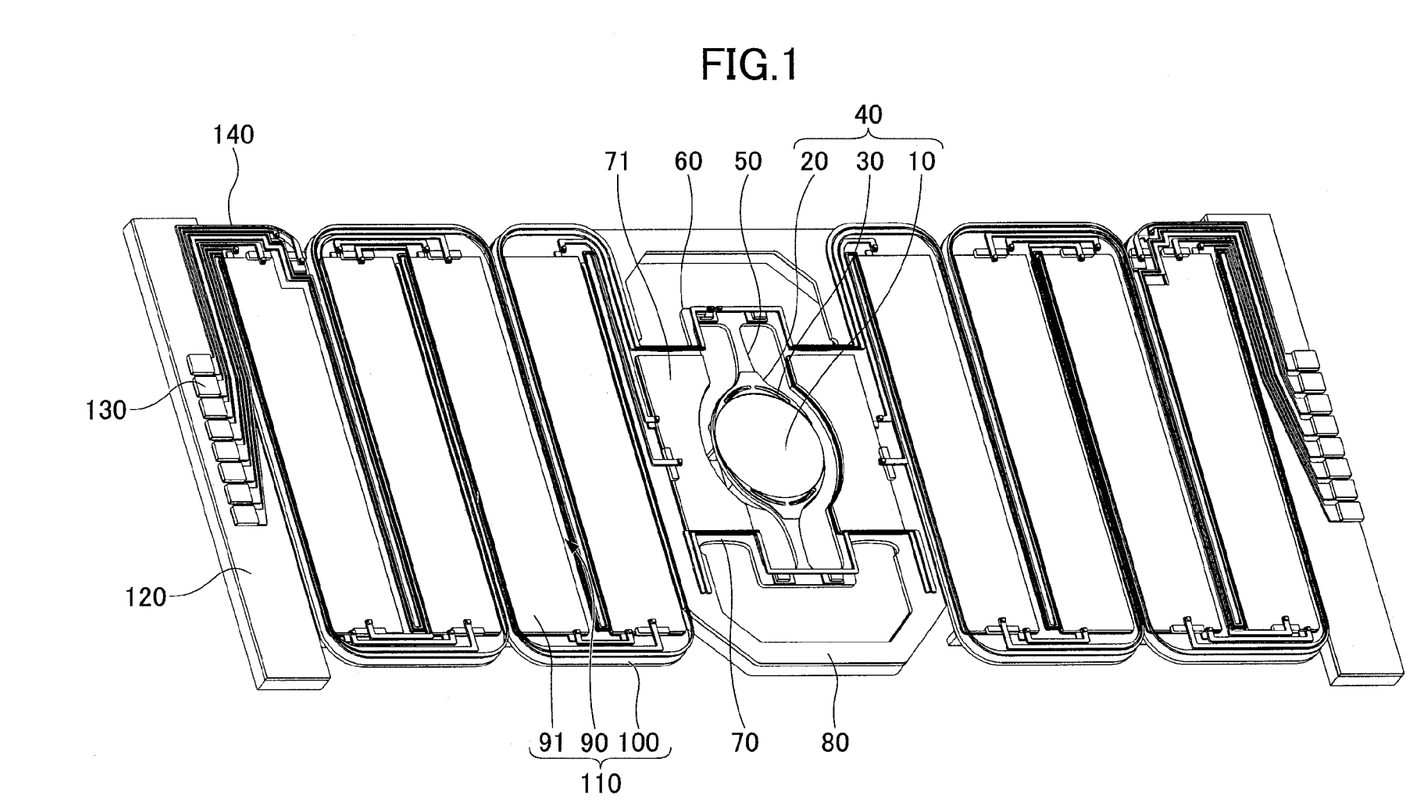
FIG. 1 is a perspective view showing the upper surface of an example of an optical scanning device of a first embodiment of the present invention.

FIG. 1 is a view showing the upper surface of an example of an optical scanning device of a first embodiment of the present invention. In FIG. 1, the optical scanning device of the first embodiment includes a mirror part 40, torsion bars 50, connection parts 60, horizontal drive beams 70, drive sources 71, a movable frame 80, vertical drive parts 110, frames 120, terminals 130, and interconnections 140. Moreover, the mirror part 40 includes a mirror reflecting surface 10, stress alleviation areas 20, and slits 30. The vertical drive parts 110 include vertical drive beams 90, drive sources 91, and connection parts 100.

The mirror part 40 is supported by two of the torsion bars 50 (a pair of the torsion bars 50) so as to be sandwiched from both outsides on the same straight line. The mirror part 40 includes the mirror reflecting surface 10 at the center, and the stress alleviation areas 20 are between the mirror reflecting surface 10 and the torsion bars 50. The respective alleviation areas 20 include two slits formed therein. Furthermore, the torsion bars 50 are coupled to inner corners of the horizontal beams 70. The horizontal drive beams 70 include the drive sources 71 on the surfaces, and external sides are connected to the movable frame 80.

The movable frame 80 supports and surrounds the connection parts 60, the torsion bars 50, and the mirror part 20 through the horizontal drive beams 70. One end on the back side of the movable frame 80 is coupled to one end of one of the vertical drive beam 90, and the other end of the vertical drive beams 90 coupled to the movable frame 80 is coupled to one end of another vertical drive beam 90 outside thereof.

Plural of the vertical drive beams 90 are provided on both sides of the movable frame 80 so as to sandwich the movable frame 80 in parallel to the torsion bars 50, and four vertical drive beams 90 are arranged on each one side of the movable frame 80. The four vertical drive beams 90 are connected to the adjacent vertical drive beams 90 through the connection parts 100 outside the ends of the vertical drive beams 90. More specifically, one end is connected to one end of the inner vertical drive beam 90, and the other end is connected to one end of the next outer vertical drive beam 90. One end of the most inner vertical drive beams 90 adjacent to the movable frame 80 is connected to one end of the movable frame 80 and the other end is connected in series to one end of the outer vertical drive beams 90. Furthermore, one end of the most outer vertical drive beams 90 adjacent to the frame 120 is connected to the frame 120 and the other end is connected in series to one end of the inner vertical drive beams 90. In addition, the vertical drive beams 90 include the drive sources 91.

The four vertical drive beams 90 on one side constitute the vertical drive part 110 of one side, and eight vertical drive beams 90 on both sides constitute the whole vertical drive part 110 at each side. The frame 120 supports the vertical drive part 110 through the most outer vertical drive beam 90. The terminals 130 are provided on the surface of the frame 120, and the interconnections 140 are connected to the terminals 130. The drive sources 71, 91 are, for example, made of a drive source that drives by supply of electricity such as a piezoelectric device that drives by extending and contracting due to application of voltage and the like, and the interconnections 140 are provided to supply voltage to the drive sources 71, 91.

Next, a more detailed description is given below about the respective components.

The mirror part 40 is a member to hold the mirror reflecting surface 10, and includes the mirror reflecting surface 10 at the center. The mirror reflecting surface 10 is a surface to reflect irradiated light, and for example, metallic foil with a high reflectance such as silver, copper and aluminum may be used. In general, with respect to the mirror reflecting surface 10, a size and a shape are specified by standards or specifications, and the shape is often determined to be a circle. For example, the mirror reflecting surface 10 may be formed by being attached onto the center of the mirror part 40.

The stress alleviation areas 20 are areas to alleviate torsion stresses of the torsion bars 50 and to reduce stresses applied to the mirror reflecting surface 10. A detailed description about the stress alleviation areas 20 are given below, but by providing a space part between the torsion bars 50 and the mirror reflecting part 10, the stress alleviation areas 20 can distribute the stresses generated by the torsional motion of the torsion bars 50, and alleviate the stresses applied to the mirror reflecting surface 10.

The slits 30 are provided in the stress alleviation areas 20, and are holes to distribute the stresses applied to the stress alleviation areas 20. By further providing the slits 30 in the stress alleviation areas 20, the stresses applied to the stress alleviation areas 20 can be further distributed. However, a detailed description about the slits 30 is given below.

The torsion bars 50 are units to support the mirror part 40 from both sides and to swing the mirror part 40 in a horizontal direction. Here, the horizontal direction is a direction in which light reflected from the mirror reflecting surface 10 deflects and moves at high speed, which means a transverse direction of a projection plane. In other words, the horizontal direction is a direction in which the mirror reflecting surface 10 swings in the transverse direction, and is a direction for which the torsion bars 50 become an axis. The torsion bars 50 swing the mirror part 40 in the horizontal direction by twisting right and left alternately.

The connection parts 60 are a transmission medium to transmit a drive force in the horizontal direction generated in the horizontal drive beams 70 to the torsion bars 50.

The horizontal drive beams 70 are drive units to swing the mirror part 40 in the horizontal direction and to scan the projection plane with the light reflected by the mirror reflecting surface 10 in the horizontal direction. The horizontal drive beams 70 can include, for example, the drive sources 71 such as the piezoelectric device on the surface, and a thin film of the piezoelectric device can be formed on the surface of the horizontal drive beams 70. The piezoelectric device is a device that expands and contracts by applying a voltage, and can curve the right and left horizontal drive beams 70 upward alternately by applying different voltages in phase alternately to the piezoelectric devices on both sides of the mirror part 40. This provides torsion forces for the torsion bars 50, and enables the mirror part 40 to swing around the torsion bars 50 to be an axis in the horizontal direction.

In addition, for example, a resonant drive may be used for a drive by the horizontal drive beams 70. When the optical scanning device of the present embodiment is used for a projector and the like, in general, since a high-speed scanning of about 30 kHz is required in the horizontal direction, it is preferable to drive the mirror part 40 by the resonant drive to be able to perform a high-speed scanning.

Here, most of the mirror part 40, the torsion bars 50, the connection parts 60, and the horizontal drive beams 70 are configured to be thin enough to have elasticity, and for example, may be made of a thin plate of a silicon substrate.

The movable frame 80 surrounds and supports the mirror part 40, the torsion bars 50, the connection parts 60, and the horizontal drive beams 70 from outside, and becomes a swing object in swinging around a vertical axis in a direction perpendicular to the torsion bars 50. Because the movable frame 80 is required to fix and support the horizontal drive beams 70, the movable frame 80 is configured to be thicker than the above-mentioned torsion bars 50, the connection parts 60 and the horizontal drive beams 70; more specifically to be several times thicker than those so as to not to have as much elasticity. For example, when the torsion bars 50, the connection parts 60, and the horizontal drive beams 70 are configured to be the same thickness, about 50 μm, the movable frame 80 may be configured to be more than 250 μm thick. For example, when the optical scanning device of the first embodiment is made of a SOI (Silicon On Insulator) substrate, a part of the silicon substrate to be a thin plate of an active layer may be used for a place that requires the elasticity such as the torsion bars 50, and the whole part laminated by the active layer, a buried oxide film and a supporting substrate may be for a thick part such as the movable frame 80.

The vertical drive parts 110 are rectangular, and include the plural vertical drive beams 90 arranged in parallel to the horizontal axis formed by the torsion bars 50. The vertical drive beams 90 respectively include the drive sources 91, and can be driven in independent phases. For example, the piezoelectric devices may be used for the drive sources 91, and in this case, by applying different voltages in phase to the vertical drive beams 90 adjacent to each other, the movable frame 80 can be swung (tilted) so as to lean forward and backward. Since the mirror part 40 is supported by the movable frame 80, following the swing of the movable frame 80, the mirror part 40 swings in the vertical direction similarly.

The vertical drive part 110, for example, may swing the movable frame 80 by non-resonant drive. In the vertical drive, high-speed driving is not required compared to the horizontal drive, and for example, about 60 Hz frequency may be enough. Moreover, because the plural vertical drive beams 90 are provided, the non-resonant drive may often meet the required speed by accumulation of displacements.

A detailed description is given below about a configuration of the vertical drive part 110, but an even number of the vertical drive beams 90 are provided in the optical scanning device of the present embodiment. This allows the vertical drive beams 90 acting on the swing forward and backward to be always constant, which makes it possible to swing forward and backward evenly.

The frame 120 is a fixing and support member to support the vertical drive parts 110 and the movable frame 80, and supports the vertical drive parts 110 through the most outer vertical drive beams 90, and further supports the movable frame 80 through the vertical drive parts 110.

The vertical drive beams 90 and the connection parts 100 are made of a thin plate so as to have elasticity, but the frame 120 is made of a thick plate without the elasticity.

The terminals 130 are provided in the frame 120, and supply electricity to the interconnections 140. With this, electricity is supplied to the drive sources 71, 91, and the swing driving can be performed in the horizontal and vertical directions.

Figure 2:
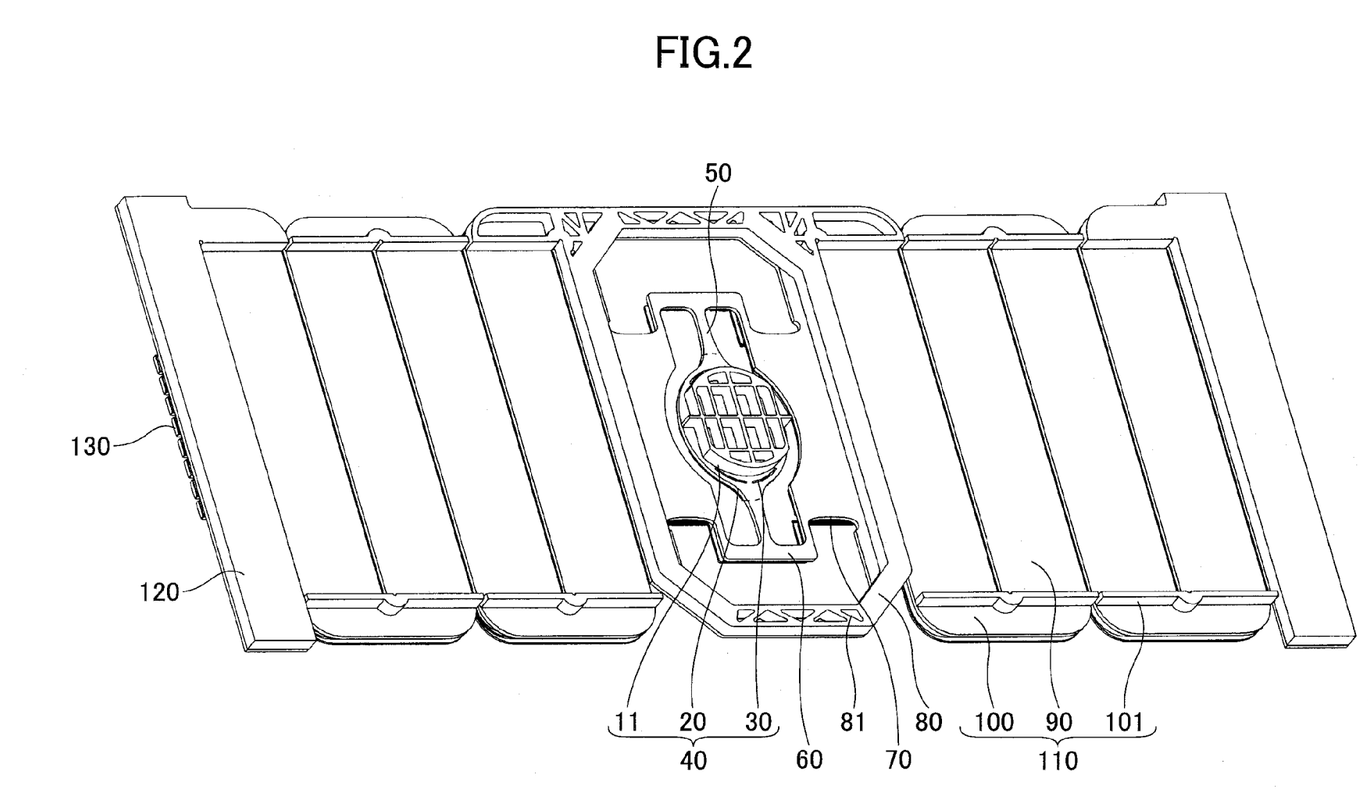
FIG. 2 is a perspective view showing the back surface of an example of the optical scanning device of the first embodiment of the present invention.

FIG. 2 is a perspective view showing the back surface of an example of the optical scanning device of the first embodiment of the present invention. In FIG. 2, the same numerals are put to components similar to those of FIG. 1.

In FIG. 2, ribs 11 are provided on the back surface of the mirror reflecting surface 10. The ribs 11 can prevent deformation of the mirror reflecting surface 10 from occurring while driving, and can keep the mirror reflecting surface 10 flat. The ribs 11 are formed to approximately coincide with the shape of the mirror reflecting surface 10. This makes it possible to make the mirror reflecting surface 10 flat across the entire surface.

The slits 30 are provided in the stress alleviation areas 20 between the ribs 11 and the torsion bars 50. This can distribute the stresses transmitted from the torsion bars 50 in the stress alleviation areas 20, and can prevent the stresses from being transmitted to the ribs 11.

Hollow parts 81 are provided in the movable frame 80. The hollow parts 81 are depressions formed to reduce weight of the movable frame 80. Because the movable frame 80 functions to support the horizontal drive beams 70, the movable frame 80 is configured to be thick. However, the movable frame 80 is also the drive object itself to swing in the vertical direction; if it is heavy, displacement decreases when the same voltage is applied to it, and sensitivity decreases. Accordingly, by providing the hollow parts 81 in the movable frame 80 and reducing the weight, the sensitivity can be improved.

In addition, when the movable frame 80 is driven at 60 Hz, for example, if there are unnecessary resonant frequencies in multiples of 60 Hz (e.g., 120 Hz, 180 Hz, 240 Hz, . . . ), noise increases. In other words, it is preferable that the unnecessary resonant frequencies do not exist around the multiples of the drive frequency as a vibration characteristic. By reducing the weight, the unnecessary resonant frequencies can be made higher, and the unnecessary resonant frequencies can be away from the neighborhood of the multiples of the drive frequency. Moreover, even if the unnecessary resonant frequencies are the multiples of the drive frequency, when the unnecessary resonant frequencies are away from 60 Hz, that is to say, when the unnecessary resonant frequencies are on the high frequency side, they have a little effect. In other words, by reducing the weight of the movable frame 80, the unnecessary resonant frequencies can be made higher, by which the noise can be reduced. Here, a detailed description is given below about a shape, arrangement and the like of the hollow parts 81.

Other than the movable frame 80 and the frame 120, ribs 101 are formed on the back surfaces of the corresponding connection parts 100 connecting the adjacent vertical drive beams 90 in the vertical drive parts 110 to each other. The ribs 101 serve to reinforce connections between the vertical drive beams 90.

Figures 3A, 3B:
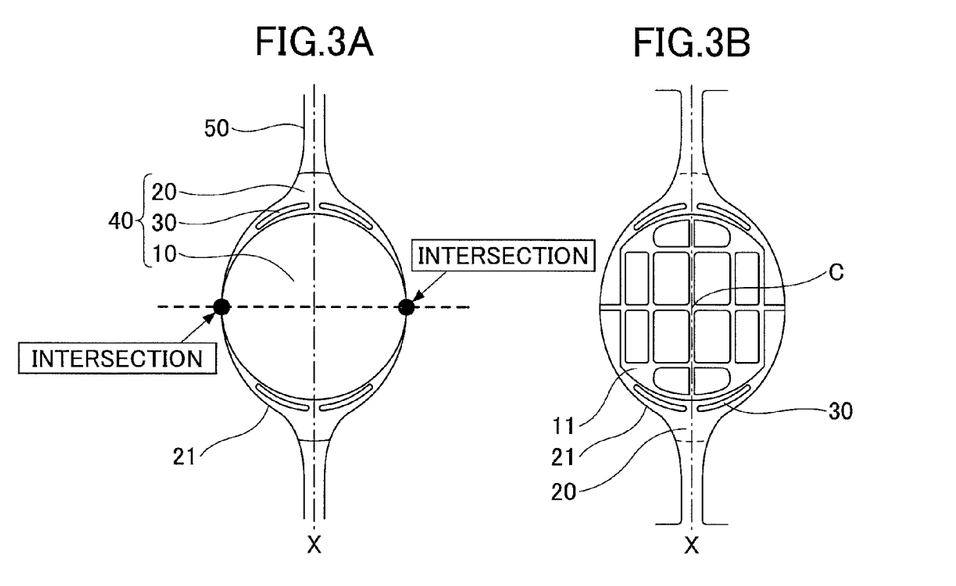
FIG. 3A is a configuration view on the upper surface of a neighborhood of a mirror part of an optical scanning device of the first embodiment.
FIG. 3B is a configuration view on the back surface of a neighborhood of the mirror part of the optical scanning device of the first embodiment.

FIGS. 3A and 3B are views for illustrating the stress alleviation structure of the optical scanning device of the first embodiment in more detail. FIG. 3A is a view showing a configuration on the upper surface around the mirror part of the optical scanning device of the first embodiment. FIG. 3B is a view showing a configuration on the back surface around the mirror part of the optical scanning device of the first embodiment.

As shown in FIG. 3A, on the upper surface, the mirror part 40 includes the stress alleviation areas 20 between the circular mirror reflecting surface 10 and the torsion bars 50. Moreover in FIG. 3A, there are intersections between the vertical axis perpendicular to the rotation (swing) axis X and the mirror part 40, and the stress alleviation areas 20 are provided between the intersections and the torsion bars 50. Furthermore, two arc-like slits 30 are formed symmetrically about the rotation (swing) axis X in the respective stress alleviation areas 20.

As shown in FIG. 3B, on the back surface, the ribs 11 are formed grid-like in an area similar to the mirror reflecting surface 10, corresponding to a circular shape of the mirror reflecting surface 10. This is to ensure flatness of the mirror reflecting surface 10, and reinforces the entirety of the mirror reflecting surface 10 with the grid-like rib pattern. However, because the ribs 11 become a heavy load and cause a decrease of deflection angle sensitivity of the mirror part 40, reducing the thickness is performed to the extent possible. As a result, as shown in FIG. 3B, the grid-like ribs 11 are formed.

In FIG. 3B, with respect to the mirror part 40, an outside dimension in a direction perpendicular to the rotation axis X is approximately the same as a dimension of the mirror reflecting surface 10. More specifically, in a vertical range within ⅔ of a diameter including the center C of the mirror reflecting surface 10, the outside dimension of the mirror part 40 is approximately the same as the dimension of the mirror reflecting surface 10. In other words, the stress alleviation areas 20 are not formed at least in a part that passes the center C of the mirror reflecting surface 10 in a direction perpendicular to the rotation axis. The reason is because a sensitivity decrease of the mirror reflecting surface 10 occurs due to inertial moment if there is a substantial weight away from the rotation axis X.

On the other hand, since the weight close to the rotation axis X does not have as much effect as the weight away from the rotation axis X, the outside dimension of the mirror part 40 in the rotation axis direction is made larger than the mirror reflecting surface 10, and a space is provided as the stress alleviation areas 20. By providing the stress alleviation areas 20, the ribs 11 are distanced from the torsion bars 50 that generate the stresses, and thereby the stresses in the ribs 11 can be alleviated, and destruction of the ribs can be prevented.

Here, as shown in FIGS. 3A and 3B, it is preferable that a planar shape of the stress alleviation areas 20 is a shape that widens toward the end from the torsion bars 50 toward the mirror reflecting surface 10. The stress alleviation areas 20 requires a broad space to some extent in order to alleviate the stresses generated in the torsion bars 50 because the stress itself does not transmit in the transverse direction, and the above-mentioned occurrence of the inertial moment affects the rotation (swing) in an adverse way even if the stress alleviation areas 20 are formed into a shape like a rectangle that precipitously extends transversally from the torsion bars 50. As long as the stress alleviation areas 20 have a shape like an open fan as shown in FIGS. 3A and 3B, the stress can be distributed, and does not have a harmful effect on the swinging.

Moreover, as shown in FIGS. 3A and 3B, a planar shape of the edges 21 of the stress alleviation areas 20 is preferred to be a curve. Because the torsion bars 50 carry out the torsional motion, stresses occur at the edges 21, but if the edges 21 include an edge shape having a corner, the stress is likely to concentrate on the corner part, which may readily cause destruction. Hence, by forming the edges 21 of the stress alleviation areas 20 into around shape, such destruction caused by the stress concentration can be prevented. Here, the edges 21 of the stress alleviation areas 20 may include a straight portion as long as they do not include a corner portion. This is because the stress does not focus thereon as long as the straight portion does not form the corner portion.

Figure 4:
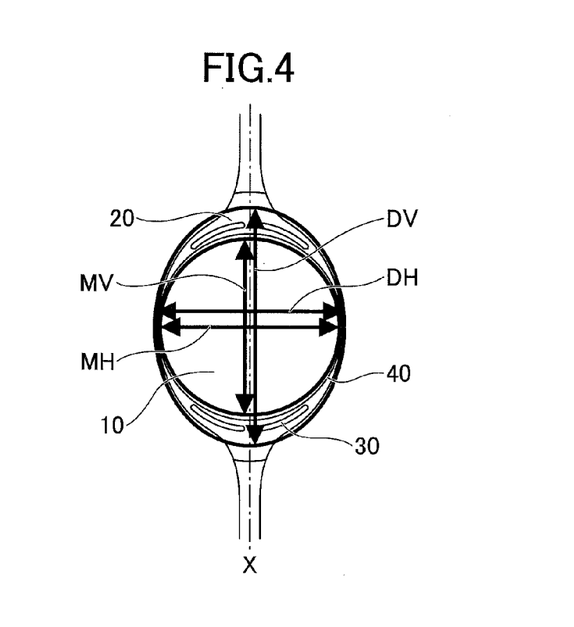
FIG. 4 is a view showing a size relationship between a mirror reflecting surface of the mirror part and a stress alleviation area of the optical scanning device of the first embodiment.

FIG. 4 is a view showing a dimensional relationship between the mirror reflecting surface 10 of the mirror part 40 and the stress alleviation areas 20 of the optical scanning device of the first embodiment.

In FIG. 4, if a vertical dimension of the mirror reflecting surface 10 is made MV; a horizontal dimension of the mirror reflecting surface 10 is made MH; a vertical dimension of the mirror part 40 is made DV; and a horizontal dimension of the mirror part 40 is made DH, the relationship of them becomes MH≈DH and MV<DV. In other words, outer shapes of the mirror reflecting surface 10 and the mirror part 40 are approximately the same in the horizontal direction, and the outer shape of the mirror part 40 is larger than that of the mirror reflecting surface 10 in the vertical direction. Here, as shown in FIG. 4, the outer shape of the mirror reflecting surface 10 is a circle, but that of the mirror part 40 is similar to an ellipse.

Moreover, the slits 30 are provided in a range from MV to DV of the stress alleviation areas 20. By providing the slits 30, the stresses transmitted to the stress alleviation areas 20 can be further distributed, but a description is given below about this point.

FIGS. 5A through 5D are views for illustrating a stress alleviation effect by the slits 30 provided in the stress alleviation area 20 of the optical scanning device of the first embodiment. FIGS. 5A through 5D show intensity distributions of the stress applied from the torsion bar 50 to the stress alleviation area 20 and the rib 11.

The rib 11 on the back side of the mirror reflecting surface 10 have an effect of reducing curvature of the mirror reflecting surface 10, but on the other hand, the stress is likely to concentrate on a part shaped like a character "L" of the base of the rib 11. More specifically, when the optical scanning device of the present embodiment is configured to be a MEMS (Micro Electro Mechanical System) structure, the MEMS may be often made of a SOI wafer that is formed by attaching silicon substrates on both sides of an insulating oxide film (e.g., $SiO_2$ in general). In this case, because the above-mentioned L-character shaped part corresponds to a joint part between the insulating oxide film and a silicon wafer, if a vertical force component is applied to the mirror reflecting surface 10, abrasion occurs and proceeds from the joint part, and leads to the destruction in many cases.

Therefore, in the optical scanning device of the present embodiment, the force generated by the torsion bar 50 and reaching the L-character shaped part of the ribs 11 is reduced by placing the outside edge of the mirror part 40 in the rotation direction distant from the rib 11, and by providing the stress alleviation area 20, and further the force component in the vertical direction that reaches the above-mentioned L-character shaped part is distributed to plural places.

Figure 5A:
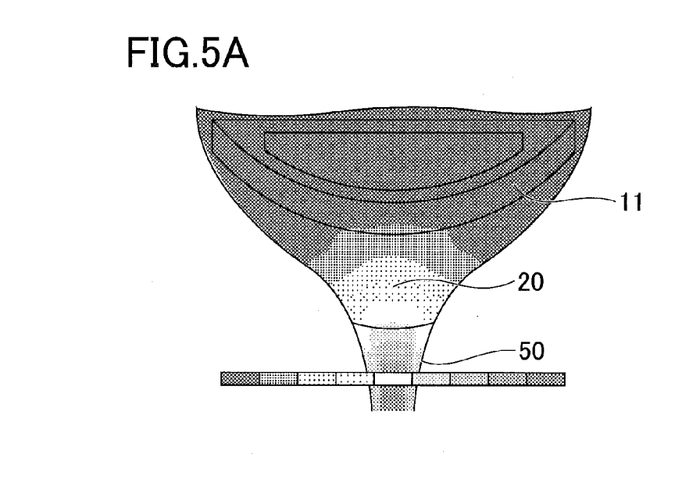
FIG. 5A is a view showing a stress intensity distribution when a slit is not provided in the stress alleviation area.

FIG. 5A shows a stress intensity distribution when the slit 30 is not provided in the stress alleviation area 20. In FIG. 5A, the stress generated in the torsion bar 50 decreases with increasing distance from the torsion bar 50, and the stress reaching the rib 11 is lower than the stress generated in the torsion bar 50. This is because the stress is alleviated by the stress alleviation area 20. However, the stress having reached the rib 11 is concentrated on the rotation axis X (which is not shown in FIG. 5A) that is an extension of the torsion bar 50.

Figure 5B:
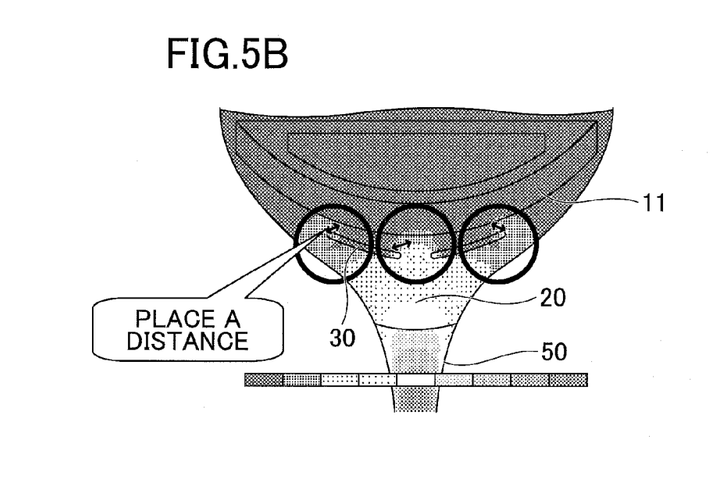
FIG. 5B is a view showing a stress intensity distribution when a slit is provided in the stress alleviation area.

FIG. 5B is a view showing a stress intensity distribution when the slit 30 is provided in the stress alleviation area 20. In FIG. 5B, by providing two slits 30 symmetrically about the rotation axis X, away from the rib 11, the stress in the stress alleviation area 20 is distributed into three parts, and more specifically, the stresses having reached the rib 11 are in a part on the rotation axis X between the two slits 30 and in two parts outer than the respective slits 30. As a result of that, a magnitude for one stress that reaches the rib 11 is reduced and becomes low, so that application of an intense stress to a specific place of the rib 11 can be prevented. Here, if the slit 30 is provided close to the rib 11, an effect of blocking the stress by the slit 30 does not work, and the stress is applied to the rib 11 directly. Hence, the slits 30 are preferable to be provided away from the rib 11 to some extent.

Figure 5C:
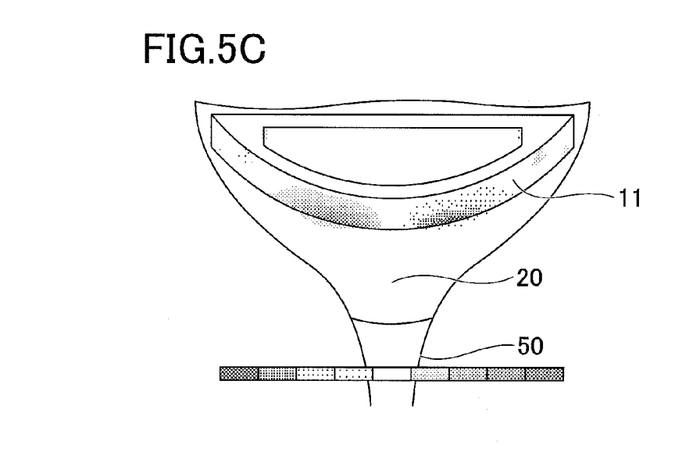
FIG. 5C is a view showing a stress intensity distribution in a vertical direction when a slit is not provided in the stress alleviation area.

FIG. 5C is a view showing a stress intensity distribution in the vertical direction when the slits 30 are not provided in the stress alleviation area 20. As shown in FIG. 5C, when the slits 30 do not exist, the stresses concentrate on two places of the rib 11. Here, the two stress concentration places are shown different from FIG. 5A, because respective stress concentration places are shown in positive and negative swings by limiting the stress components to the vertical directions.

Figure 5D:
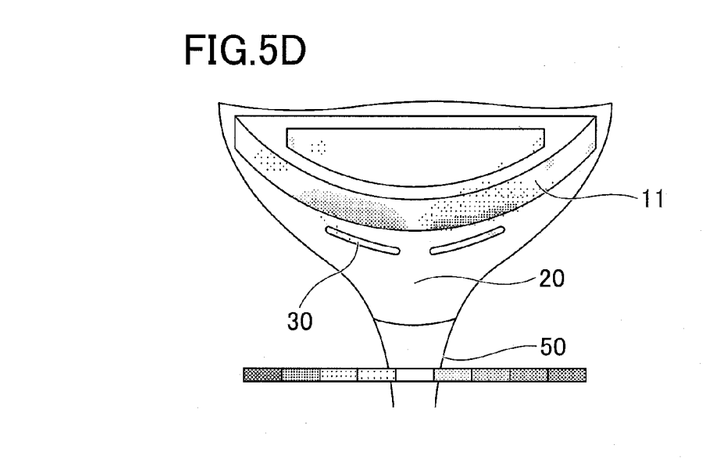
FIG. 5D is a view showing a stress intensity distribution in a vertical direction when a slit is provided in the stress alleviation area.

FIG. 5D is a view showing a stress intensity distribution in the vertical direction when the slits 30 are provided in the stress alleviation area 20. As shown in FIG. 5D, when slits 30 exist, the stresses are distributed to places where the slits 30 do not exist, and it is noted that the stress concentration is distributed into four places. This causes magnitudes of the respective distributed stresses to decrease, so that the stress applied to the rib 11 can be reduced, and the destruction can be prevented.

Here, the slits 30 are configured to have an arc-like shape so as to resemble the outside shape of the mirror reflecting surface 10, but since an effect of the stress distribution can be obtained if the slits 30 are linear or have another shape, the shape of the slits 30 may be changed in accordance with an intended use.

In this manner, by providing the stress alleviation area 20 and slits 30 in the mirror part 40, the destruction of the mirror part 40 can be prevented, and a service life of the optical scanning device can be improved.

Figure 6:
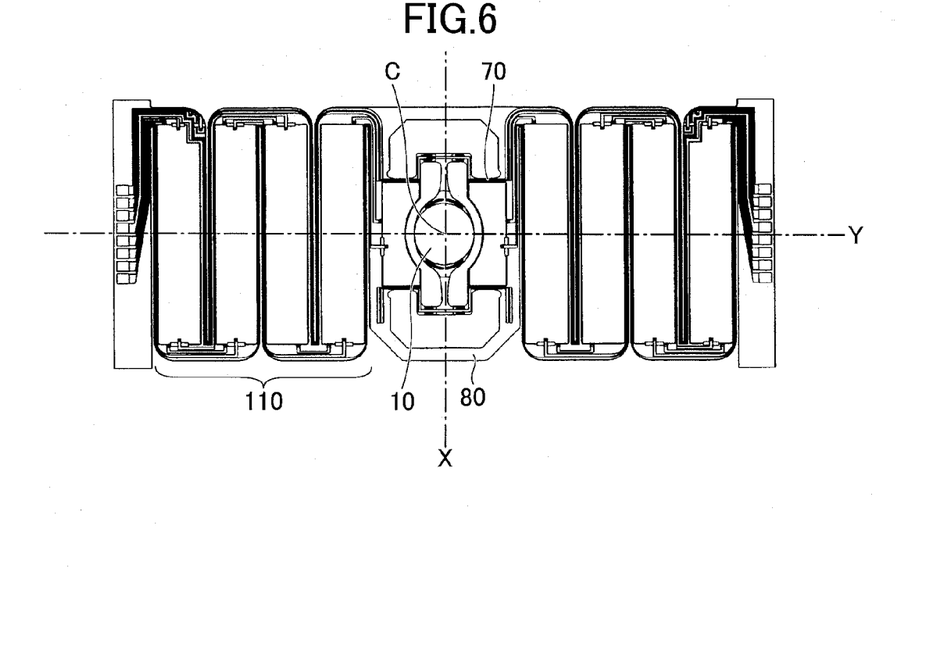
FIG. 6 is a view showing an arrangement of an axis of the optical scanning device of the first embodiment.
Figure 7:
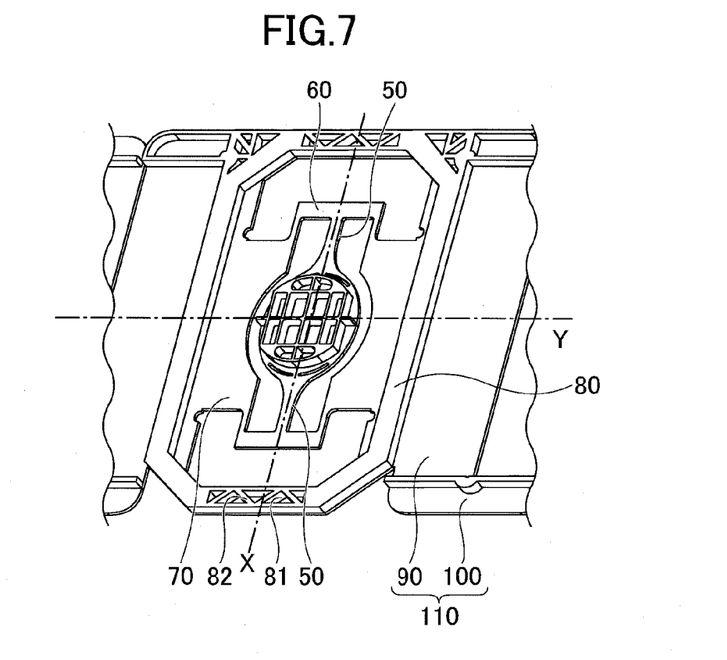
FIG. 7 is an enlarged perspective view of a movable frame of the optical scanning device of the first embodiment.

Next, a detailed description is given about reducing the weight of the movable frame 80, using FIGS. 6 and 7.

FIG. 6 is a view showing an arrangement of axes of the optical scanning device of the first embodiment. As shown in FIG. 6, the optical scanning device of the first embodiment is configured to be a biaxial optical scanning device including a horizontal rotation axis X that passes through the torsion bars 50, and a vertical rotation axis Y that is perpendicular to the torsion bars 50 and passes through the center C of the mirror reflecting surface 10. The movable frame 80 of the biaxial optical scanning device functions to support the horizontal drive beams 70 provided inside the movable frame 80 oscillating at high speed, and becomes a heavy load that decreases sensitivity for the vertical drive parts 110 provided outside the movable frame 80.

Here, because the inertial moment that impedes the motion increases as a heavy weight is located away from the vertical rotation axis Y, the weight savings of the movable frame 80 by partially reducing the thickness of the movable frame 80 formed in a rib shape have an effect on improvement of the drive sensitivity.

FIG. 7 is an enlarged perspective view of the movable frame 80 of the optical scanning device of the first embodiment. As shown in FIG. 7, the horizontal drive parts of the mirror part 40 are configured inside the movable frame 80. Here, the horizontal drive part includes the horizontal drive beam 70, the drive source 71, the connection part 60, and the torsion bar 50. By driving the horizontal drive parts, the mirror reflecting surface 10 swings around the horizontal rotation axis X.

As shown in FIGS. 1, 2 and 6, the vertical drive beams 90 are arranged to snake their way in a zigzag manner, and oscillate with the movable frame 80 around the vertical rotation axis by driving the vertical drive parts 110. To reduce the weight of this movable frame 80 that becomes a heavy load for the vertical drive parts 110, portions of the movable frame 80 distant from the vertical rotation axis Y are cut away. Accordingly, as shown in FIG. 7, the plural hollow parts 81 are formed in part of the upper side and the lower side of the movable frame 80 distant from the vertical rotation axis Y.

The hollow parts 81 do not penetrate through the movable frame 80, but are depressed by stopping in the middle of boring holes. Moreover, the hollow parts 81 are formed to be triangles, and are arranged so that the apexes of the triangles face outward alternately along a longitudinal direction of the movable frame 80. This causes a thick part 82 in which the movable frame 80 is left to be formed in a zigzag shape, and enables any part along the movable frame 80 to have the thick part 82 remaining. Furthermore, because the thick part 82 is retained uniformly even in a width direction, strength is kept high in an area where the hollow parts 81 are formed, and rigidity can be maintained.

Thus, by forming the hollow parts 81 to be plural triangular depressions whose apexes alternately switch their directions along the movable frame 80, the thickness reduction can be implemented, leaving the thick part 82 of the zigzag shape, and the weight saving can be carried out, while maintaining the rigidity.

Here, the hollow parts 81 may not be a mathematically exact triangle, but maybe an approximate triangle having a round corner or curved side. Even in this case, since the thick part 82 becomes an approximate zigzag shape, and the thick part 82 can be maintained approximately uniformly in any places of the movable frame 80 in the longitudinal and width directions, the rigidity can be maintained, while implementing the weight saving.

Furthermore, in the present embodiment, a description is given about the hollow parts 81 by taking an example of providing the hollow parts 81 only in the upper side and the lower side of the movable frame 80 to be areas that coincide with an extending direction of the horizontal rotation axis X; but if performing further weight saving, the hollow parts 81 may be provided even in other areas. For example, the hollow parts 81 may be provided across in the whole circumference. Thus, the hollow parts 81 can be provided in various shapes and arrangement configurations according to the intended use.

Figure 8:
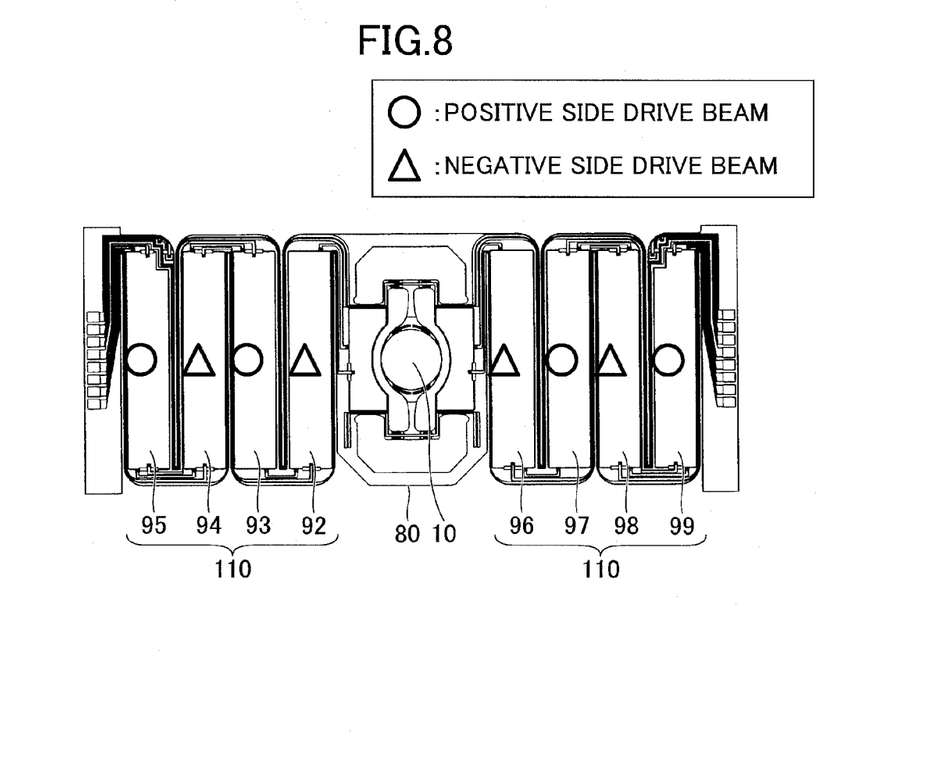
FIG. 8 is a view for illustrating a configuration of a vertical drive part of the optical scanning device of the first embodiment.

Next, a detailed description is given about a configuration of the vertical drive parts 110, using FIG. 8. FIG. 8 is a view for illustrating the configuration of the vertical drive parts 110 of the first embodiment.

FIG. 8 shows a plan view of the optical scanning device of the first embodiment, and the vertical drive parts 110 include four on one side, for a total eight vertical drive beams 92 through 99 on both sides. Among the vertical drive beams 92 through 99, circle marks are attached to the vertical drive beams 93, 94, 97, 99 to which a forward voltage is applied, and triangle marks are attached to the vertical drive beams 92, 94, 96, 98 to which a turnover voltage formed in a waveform where the forward voltage is reversed vertically is applied.

The forward voltage is a drive waveform that is generated in a range from the zero voltage to the maximum voltage (Vmax), for example, a drive waveform formed of a sine wave or a saw-tooth wave. The turnover voltage is half voltage (Vmax/2) of the maximum voltage (Vmax), and is a drive waveform formed of a waveform where the forward voltage is reversed vertically. Here, when a sine wave is used as a drive waveform for driving the horizontal axis, the turnover voltage may be obtained by shifting 180 degrees in phase.

Here, the left drive beams 93, 95 and the right drive beams 97, 99 to which the circle marks are attached are symmetric about the mirror reflecting surface 10 and the movable frame 80, and similarly, the left drive beams 92, 94 and the right drive beams 96, 98 to which the triangle marks are attached are symmetric about the mirror reflecting surface 10 and the movable frame 80. Then, the positive-side drive beams 93, 95, 97, 99 to which the circle marks are attached are provided two on the left side of the movable frame 80 and two on the right side, the same number on both sides. Similarly, the negative-side drive beams 92, 94, 96, 98 to which the triangle marks are attached are provided two on the left side of the movable frame 80 and two on the right side, the same number on both sides. Accordingly, when the turnover voltage is applied to the drive beams 93, 95, 97, 99 of the circle marks, and the forward voltage is applied to the drive beams 92, 94, 96, 98 of the triangle marks, the drive beams 92 through 99 to which the vertically opposite voltages are applied are respectively two on the right side and the left side of the movable frame 80, and displacements of the same inclination amount is always provided for the movable frame 80.

In this way, by making the number of the drive beams 92 through 99 an even number, a forward inclination amount of the movable frame 80 and a backward inclination amount can be the same as each other. In general, the optical scanning device is often incorporated in a small product such as a cellular phone and the like, and may be configured to make the number of the vertical drive beams 92 through 99 an odd number in relation with a space and the like. In this case, because the inclination amount of the movable frame 80 is different in forward and backward inclinations, if sizes of the projection planes are different, the projection center is offset for each size of the projection plane, and adjustment in a detailed point maybe required in installing the optical scanning device.

However, in the optical scanning device of the present embodiment, because the vertical drive beams 92 through 99 are made even, even if the projection sizes are different from each other, the projection center can be always constant, and the optical scanning device can be readily installed even if used for a variety of intended uses and various projection sizes.

Thus, according to the optical scanning device of the first embodiment, by providing the stress alleviation area 20 between the mirror reflecting surface 10 and the torsion bar 50, an influence of the stress generated in the torsion bar 50 on the mirror reflecting surface 10 can be reduced. Moreover, by providing the slits 30 in the stress alleviation area 20 if desired, the stress can be distributed, and the influence on the mirror reflecting surface 10 can be further reduced.

Furthermore, by cutting away a part of the movable frame 80, the weight of the movable frame 80 is reduced to improve the sensitivity, and the noise can be reduced. In addition, by making the number of the vertical drive beams 90 an even number, a swing amount of the positive side and the negative side can be the same to each other, and an installation of the optical scanning device can be easier.

Second Embodiment

Figure 9:
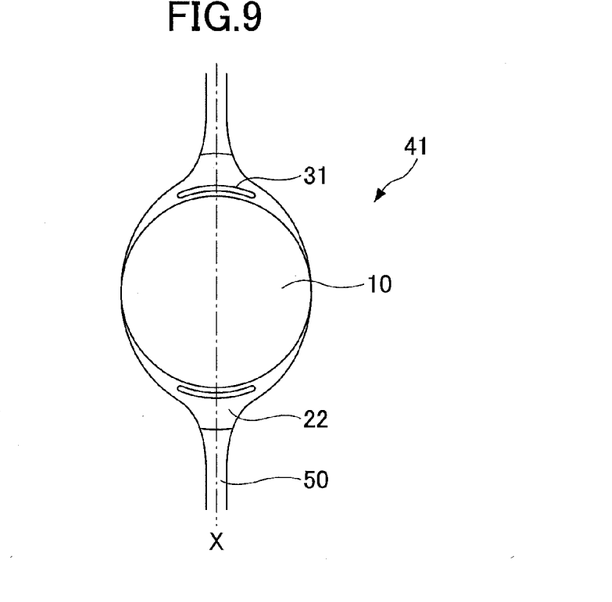
FIG. 9 is a view showing an example of an optical scanning device of a second embodiment of the present invention.

FIG. 9 is a view showing an example of an optical scanning device of a second embodiment of the present invention. In FIG. 9, the mirror reflecting surface 10, a mirror part 41, and the torsion bars 50 are shown. Since the other components are similar to those of the first embodiment, showing them in their drawing and the descriptions are omitted. Moreover, in FIG. 9, same numerals are put to the components similar to those in the first embodiment, and the description is omitted.

In FIG. 9, the mirror part 41 includes the mirror reflecting surface 10, stress alleviation areas 22, and slits 31. The optical scanning device of the second embodiment is different from that of the first embodiment in that only a single slit 31 is provided in one stress alleviation area 22. In this way, the slit 31 may be singular. Even in this case, because the stress generated from the torsion bar 50 is distributed to both outer sides of the slit 31, a stress alleviation effect is generated.

Furthermore, in the optical scanning device of the second embodiment, since the slit 31 is preferred to be arranged symmetrically about the horizontal rotation axis X, the center of the slit 31 is preferably arranged on the horizontal rotation axis X.

Here, the optical scanning device of the second embodiment is similar to that of the first embodiment in that the slit 31 is preferably arranged away from the rib 11 (which is not shown in FIG. 9), and in that a shape of the slit 31 may not be an arc-like shape necessarily.

According to the optical scanning device of the second embodiment, the stress generated in the torsion bar 50 can be distributed by a simple slit shape, and destruction of the rib 11 can be prevented.

Third Embodiment

Figure 10:
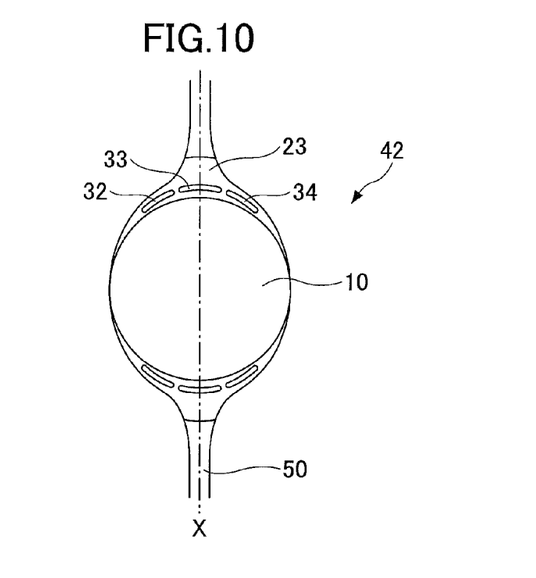
FIG. 10 is a view showing an example of an optical scanning device of a third embodiment of the present invention.

FIG. 10 is a view showing an example of an optical scanning device of a third embodiment of the present invention. In FIG. 10, the mirror reflecting surface 10, a mirror part 42, and the torsion bars 50 are shown, but since the other components are similar to those in the first embodiment, showing them in the drawing and their description are omitted. Moreover, in FIG. 10, same numerals are put to components similar to those in the first embodiment, and the description is omitted.

The optical scanning device of the third embodiment differs from the optical scanning devices in the first and second embodiments in that respective stress alleviation areas 23 of the mirror part 42 include three slits 32, 33, 34. Thus, by increasing the slits 32 through 34 to be three, further distribution of the stress may be designed.

In the optical scanning device in the third embodiment, the slit 33 is on the horizontal rotation axis X, and the slit 32 and the slit 34 are arranged line-symmetrically about the horizontal rotation axis X. This allows the stress to be distributed approximately uniformly. Here, the stress generated in the torsion bar 50 is distributed into four places by the slits 32 through 34.

Here, the optical scanning device of the third embodiment is similar to those of the first and second embodiments in that the slits 32 through 34 are preferable to be arranged away from the rib 11 (which is not shown in FIG. 10), and a shape of the slits 32 through 34 may not be necessarily an arc-like shape.

Fourth Embodiment

Figure 11:
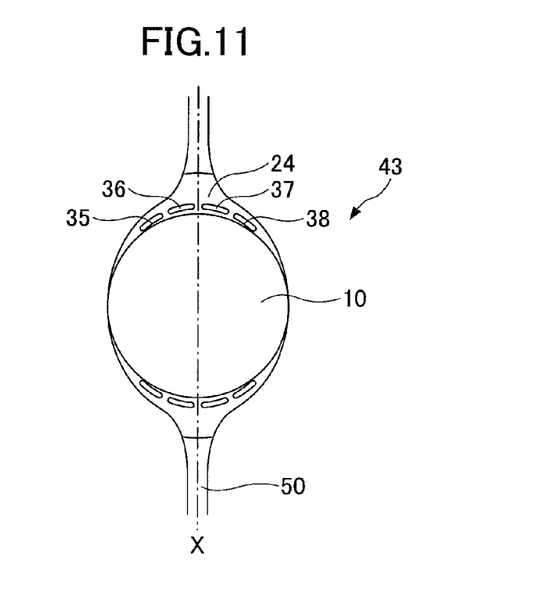
FIG. 11 is a view showing an example of an optical scanning device of a fourth embodiment of the present invention.

FIG. 11 is a view showing an example of an optical scanning device of a fourth embodiment of the present invention. FIG. 11 shows the mirror reflecting surface 10, a mirror part 43, and the torsion bars 50, but since the other components are similar to those in the first embodiment, showing those in the drawing and their description are omitted. Furthermore, in FIG. 11, same numerals are put to the components similar to those in the first embodiment, and the description is omitted.

The optical scanning device of the fourth embodiment differs from the optical scanning devices of the first through third embodiments in that respective stress alleviation areas 24 of the mirror part 43 include four slits 35, 36, 37, 38. In addition, the optical scanning device of the fourth embodiment differs from the optical scanning devices of the second and third embodiments in that the slits 35 through 38 do not exist on the horizontal rotation axis X. In this manner, further increasing the slits 35 through 38 to be four, and configuring to not arrange the slits 35 through 38 on the horizontal rotation axis X are possible. By not forming the slits 35 through 38 on the horizontal rotation axis, a turning force around the horizontal rotation axis of the torsion bars 50 can be certainly transmitted to the mirror reflecting surface 10.

In the optical scanning device of the fourth embodiment, the stress generated in the torsion bar 50 is distributed into five places. Moreover, because the slit 35 and slit 38, and the slit 36 and slit 37 are respectively arranged line-symmetrically about the horizontal rotation axis X, distribution of the stress can be performed approximately uniformly. Furthermore, by making the slits 35 through 38 an even number, since the slits 35 through 38 are not arranged on the horizontal rotation axis X, the turning force around the horizontal rotation axis X can be directly transmitted to the mirror reflecting surface 10 without decreasing, and sensitivity can be kept high.

In addition, the optical scanning device of the fourth embodiment is similar to those in the first and second embodiments in that the slits 35 through 38 may be arranged away from the rib 11 (which is not shown in FIG. 11), and a shape of the slits 35 through 38 may not be necessarily an arc-like shape.

According to the optical scanning device of the fourth embodiment, the stress can be distributed into small parts, keeping the sensitivity high, and a service life of the optical scanning device can be lengthened.

In this way, according to embodiments of the present invention, it is possible to alleviate a stress applied to a mirror part, and to reduce destruction and material fatigue.

All examples recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical scanning device comprising:
    a mirror part including a mirror reflecting surface to reflect incident light;
    a pair of torsion bars configured to support the mirror part from both sides and configured to form a first axis around which to swing the mirror part by a torsional motion thereof so as to deflect the reflected light; and
    at least one stress alleviation area configured to alleviate a stress generated by the torsional motion of the torsion bars, the alleviation area being provided between an intersection of a second axis perpendicular to the first axis and passing through the center of the mirror reflecting surface and an edge of the mirror reflecting surface, and at least one of the torsion bars.

2. The optical scanning device as claimed in claim 1, wherein the stress alleviation area has a planar shape broadening from the at least one of the torsion bars toward the mirror reflecting surface.

3. The optical scanning device as claimed in claim 1, wherein an edge of the stress alleviation area does not include a corner portion.

4. The optical scanning device as claimed in claim 1, wherein the stress alleviation area includes at least one slit.

5. The optical scanning device as claimed in claim 4, wherein the at least one slit is arranged symmetrically about the first axis.

6. The optical scanning device as claimed in claim 4, wherein the at least one slit includes plural of the slits.

7. The optical scanning device as claimed in claim 6, wherein the plural slits include an even number of the slits.

8. The optical scanning device as claimed in claim 4, wherein the slit has an arc-like shape.

9. The optical scanning device as claimed in claim 4, further comprising:
    at least one rib formed on a back surface of the mirror reflecting surface.

10. The optical scanning device as claimed in claim 9, wherein the slit is provided away from the rib.

11. The optical scanning device as claimed in claim 9, further comprising:
    a pair of horizontal drive beams provided around the mirror part and coupled to the torsion bars, the horizontal drive beams respectively including drive sources to swing the mirror part around the first axis;
    a movable frame surrounding and coupled to the first drive beams, the movable frame having the same thickness as the rib; and
    at least one hollow part provided in the movable frame, the hollow part having the same thickness as the first drive beams.

12. The optical scanning device as claimed in claim 11, wherein the at least one hollow part is provided only in an area that coincides with an extending direction of the first axis.

13. The optical scanning device as claimed in claim 11, wherein the at least one hollow part includes plural depressions formed in the movable frame.

14. The optical scanning device as claimed in claim 13, wherein the plural depressions are shaped in approximate triangles, and
    wherein apex directions of the triangles are arranged to face opposite directions alternately in parallel to the first axis along the movable frame so that a part without the depressions forms a zigzag shape along the movable frame.

15. The optical scanning device as claimed in claim 11, further comprising:
    a pair of vertical drive parts configured to support the movable frame from both sides and configured to swing the movable frame around the second axis, each of the vertical drive parts including plural vertical drive beams, the plural vertical drive beams including plural rectangular beams arranged parallel to the first axis and drive sources respectively provided on the rectangular beams; and
    an outer frame configured to support the pair of vertical drive parts from outside,
    wherein the plural vertical drive beams include a first vertical drive beam whose one end is connected to the movable frame provided inside the first vertical drive beams, a second vertical drive beam whose one end is connected to the outer frame provided outside the vertical drive beams, and the other vertical drive beams arranged adjacent and parallel to each other between the first vertical drive beam and the second vertical drive beam, the respective vertical drive beams being connected with an inner adjacent vertical drive beam and an outer adjacent vertical drive beam at opposite ends alternately so as to snake their way and to connect the other end of the first vertical drive beam with the other end of the second vertical drive beam as a whole, and
    wherein each of the vertical drive parts includes an even number of the vertical drive beams.

16. The optical scanning device as claimed in claim 15, wherein the drive sources are made of a piezoelectric device.

* * * * *